July 9, 1968  MASUO HOSOKAWA ET AL  3,391,785
POWDER SIFTING MACHINE

Filed April 12, 1966  2 Sheets-Sheet 1

INVENTORS
MASUO HOSOKAWA
TAKUZO MATSUYAMA
MASAHIRO NAKAMOTO
BY
ATTORNEY

July 9, 1968 MASUO HOSOKAWA ET AL 3,391,785
POWDER SIFTING MACHINE
Filed April 12, 1966 2 Sheets-Sheet 2

INVENTORS
MASUO HOSOKAWA
TAKUZO MATSUYAMA
BY MASAHIRO NAKAMOTO

United States Patent Office 3,391,785
Patented July 9, 1968

3,391,785
POWDER SIFTING MACHINE
Masuo Hosokawa, 48 Ueno 9-chome, Toyonaka-shi, Japan; and Takuzo Matsuyama, Takarazuka- shi; and Masahiro Nakamoto, Osaka-shi, Japan; said Matsuyama and said Nakamoto assignors to said Hosokawa
Filed Apr. 12, 1966, Ser. No. 542,109
Claims priority, application Japan, Apr. 15, 1965, 40/22,278
1 Claim. (Cl. 209—300)

ABSTRACT OF THE DISCLOSURE

Powder sifting apparatus for particle sizes of the order of 100 mesh and smaller which includes a cylindrical sieve, rotary blades within the sieve and means for imparting vibratory motion to the sieve during operation of the rotary member.

---

This invention relates to powder sifting machines and more specifically to a novel and improved machine for sifting powder having particle sizes down to 100 mesh and even smaller.

The sifting of fine powder of the order of 100 mesh and smaller has presented considerable difficulty in the past in that the powder tends to adhere to the surface because of electrostatic charges or the presence of a relatively high water component. Conventional sifting machines have utilized a variety of structures, but known structures have not been found entirely satisfactory. For instance, one such structure relying on gravitational forces embodied either an inclined rotary sieve, a vibrating sieve, or a swaying sieve. These sieves were intended to cause the powder to flow on the sieve by application of movement to the sieve so that fine particles would move through the holes due to gravity. While this type of sifting machine is satisfactory for coarse particles, it has been found that powder finer than 100 mesh would not easily pass through the holes and accordingly the sieve would become clogged. Even when the sieve was vibrated at as much as 3000 to 3600 times per minute, the speed of the sieve surface would agitate the powder particles in such a manner that they would not readily pass through the sieve. Accordingly, such procedure could only be used with particles greater than 20 mesh since the weight of the larger particles was necessary in order to carry them through the sieve. While vibrating and swaying sieves utilizing vibrations of the order of 30 to 300 vibrations per minute were somewhat more satisfactory than devices using higher vibration rates, the reaction of gravity on extremely fine particles resulted in a very low sifting efficiency and particle sizes of the order of 100 mesh and smaller could not easily be sifted.

Other sifting devices utilizing centrifugal force or air pressure to impart larger amounts of kinetic energy to the powder were also relatively ineffective because the openings in the sieve tended to be closed by coarse particles which could not pass through the sieve. In order to remove these coarse particles, brushes and other devices were tried in order to remove them mechanically. With very fine sieves formed of fine metal wires, silk, threads, or synthetic fibers, mechanical means for cleaning the sieve were not satisfactory since the abrasion quickly damaged the sieve. The use of compressed air for the same purpose was also not found satisfactory since only small areas of the sieve could be cleaned at one time and if complicated structures were utilized to clean all of the sieve surface substantial problems were entailed in collection of the fine particles that were carried out with the compressed air.

This invention overcomes the difficulties encountered with prior known devices and provides a novel and improved sifting machine that is capable of sifting fine particles of the order of 100 mesh and even smaller at a relatively high rate and without causing the sieve to become clogged. This has been accomplished by a novel and improved organization of elements embodying a generally cylindrical sieve, high speed rotary blades for imparting high velocity to the powder and vibrating means for vibrating the cylindrical sleeve to prevent large particles from remaining in the openings.

Another object of the invention resides in the provision of a novel and improved apparatus for sifting fine particles of powder.

The above and other objects of the invention will become more apparent from the following description and accompanying drawings forming part of this application.

Figure 1:
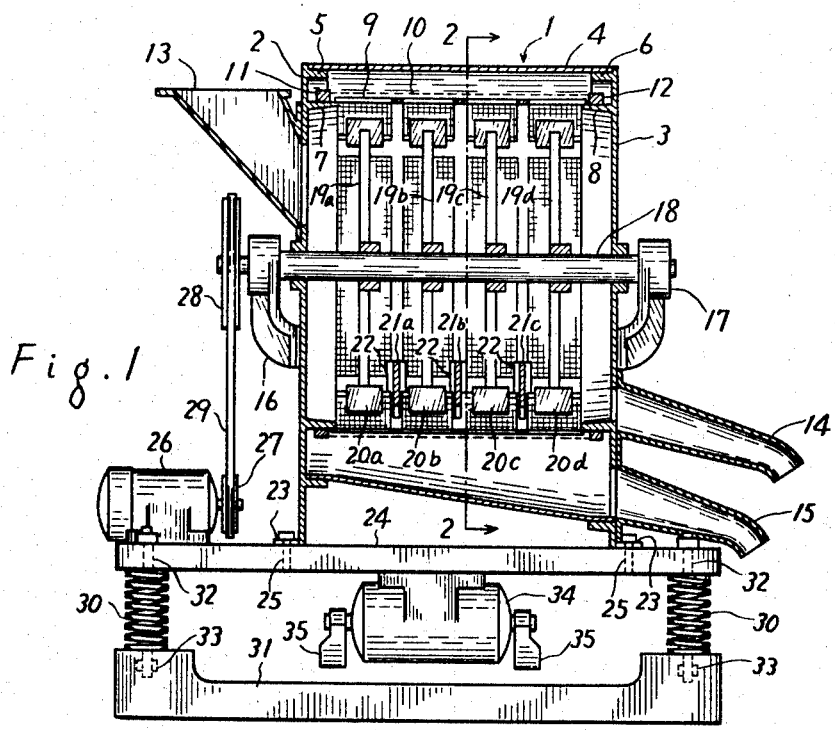
FIGURE 1 is a cross sectional view of one embodiment of a sifting machine in accordance with the invention.

The apparatus in accordance with the invention utilizes rotary elements having peripherally disposed blades to impart centrifugal force to the particles of powder and at the same time produce sufficient turbulence of the air which cooperates with the centrifugal force imparted to the particles to throw them against the surface of the sieve at speeds many times the force of gravity. In this way highly effective sifting of the particles is attained. Furthermore, inasmuch as the powder to be sifted is uniformly dispersed throughout the sifting chamber, particles are urged against the entire inner face of the cylindrical sieve s that the actual sieve area is substantially increased and the sifting of the powder per unit area is materially increased. Thus, the invention overcomes the difficulties with known devices which utilize only a small portion of the sifting area with the result that the sieve tends to clog up rapidly either because of static charges or high water content of the powder. With this invention it is preferable to vibrate the sieve during the course of rotation of blades within the sieve in order to cause the coarse particles to flow toward an exhaust outlet. This procedure avoids the need for mechanical brushing or jarring of the seve in order to remove the particles closing the openings in the sieve since such procedure have been found to materially damage the mesh.

In actual practice it has been found that the sifting procedure in accordance with the invention increases processing speeds of the order of 5 to 20 times over known devices when sifting powder having a mesh size of the order of 100, and in addition, the life of the mesh forming the sieve is extended 5 or 10 times the life of an equivalent mesh when used with known devices.

The invention further provides a novel and improved means for restricting the flow of unsifted powder toward the exhaust outlet intended principally for the coarse particles. If the rate at which the powder is supplied to known sieves is high, the layer of power on the sieve will increase materially and prevent effective sifting action. Under these conditions it has been found that fine particles will tend to flow toward the exhaust outlet along with the coarse particles. On the other hand, if the supply of powder is too small, there will be insufficient agitation of the powder. This invention overcomes these difficulties through the utilization of an improved combination of partitions or baffles with the rotary elements and the sieve to retard the flow of unsifted powder to the coarse powder outlet with the result that highly efficient sifting action is attained. With this arrangement the supply of powder to the sifting apparatus is not critical since large amounts of powder will be prevented from flowing directly toward the exhaust outlet, and only the coarse particles will tend to move in that direction. With smaller amounts of powder the action of the blades will continuously agitate the powder and produce effective sifting action.

Figure 2:
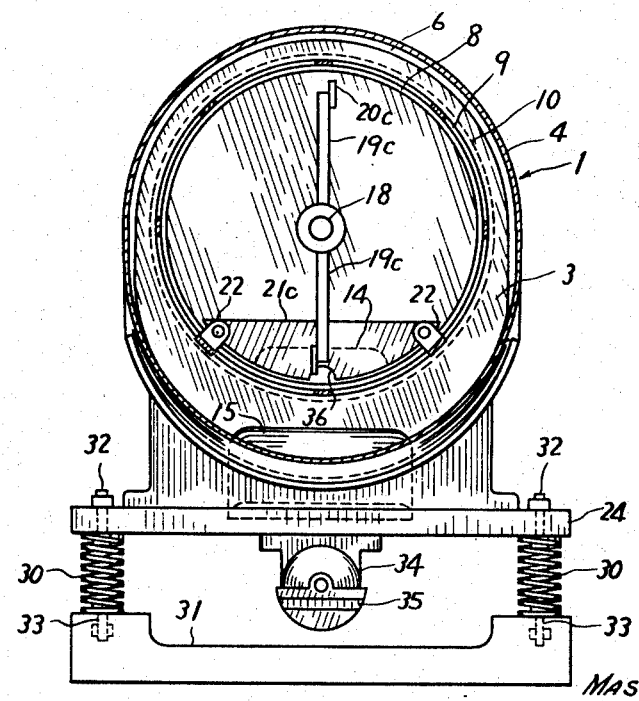
FIGURE 2 is a side elevational view of the structure shown in FIGURE 1 with the portion 2—2 of FIGURE 1 shown in section.

Referring now to the drawings and more specifically the embodiment of the invention shown in FIGURES 1 and 2, the sifting mechanism is generally denoted by the numeral 1 and comprises a pair of end plates 2 and 3 and a cylindrical wall 4 engaging annular ribs 5 and 6 extending from the end plates 2 and 3. A second set of annular ribs 7 and 8 carried by the end plates 2 and 3 receive and support a coarse basket-like reinforcing frame 9 carrying a fine cylindrical mesh or sieve 10 on the outer side thereof. The ribs 7 and 8 carry annular rings 11 and 12 respectively to center the sieve within the housing formed by the end plates 2 and 3 and the cylindrical shell 4.

An inlet 13 is carried by the end plate 2 and opens into the inside of the sieve 10. A pair of exhaust or discharge outlets 14 and 15 are carried by the end plate 3 and are disposed at the lower portion of that plate. The outlet 14 communicates with the bottom portion of the sieve 10 and permits the exhaust of coarse particles which accumulate at the bottom of the sieve and flow gradually to the right as shown in FIGURE 1. The outlet 15 communicates with the outer side of the sieve 10 and is used to exhaust the sifted powder which passes through the sieve. The vibration imparted to the sifting chamber causes the sifted particles to flow continuously through the outlet 15.

The rotary elements within the sieve 10 are mounted on a shaft 18 carried by bearings 16 and 17 secured to the end plates 2 and 3 respectively. The shaft carries a plurality of rotors 19a through 19d each of which have a plurality of outwardly extending arms carrying blades or wing plates 20a through 20d on the ends thereof. Partition plates or baffles 21a through 21c are supported between the rotary members by brackets 22 secured to the supporting frame or bracket 9. These baffles are in the form of either segments or a circle or sections of an annular ring and are positioned in spaced relationship to the bottom of the sieve 10.

The assembly 1 is supported by feet 23 secured to the end plates 2 and 3. The feet 23 are fastened to a supporting bed plate 24 by bolts 25. A motor 26 is carried by the plate 24 and is coupled to the shaft 18 by means of pulleys 27 and 28 and a belt 29. The bed 24 is in turn supported on a second bed 31 by means of a plurality of springs 30. The upper ends of the springs are held to the bed 24 by a plurality of bolts 32 and the bottom ends of the springs are secured to the bed 31 by appropriate fastening means 33. A motor 34 is secured to the bottom side of the bed 24 and the ends of the rotor shaft of the motor 34 are provided with eccentric weights 35. The motor 34 when energized vibrates the bed 24 and the housing 1, and the speed is preferably regulated to substantially synchronize the resonant frequency of the vibrations produced by the motor with the resonant frequency of the resiliently supported bed 24 and the housing 1.

With the foregoing arrangement, upon energization of the motors 26 and 34, the rotary elements 19a through 19d are rotated and the sieve 10 is simultaneously vibrated. Powder to be sifted is continuously fed toward the interior of the sieve 10 by means of the inlet 13 and the powder is dispersed as a result of the action of the blades or plates 20a to 20d, and the turbulent air flow produced thereby. The centrifugal forces imparted to the particles of the powder cause them to impinge on the inner face of the sieve at relatively high speeds whereupon the small particles pass through the mesh hitting the inner surface of the cylinder wall 4, and then falling to the bottom thereof. These sifted particles then flow down along the bottom ramp by reason of the vibration and are discharged through the outlet 15. The larger particles which do not pass through the mesh are constantly repelled by the vibration of the sieve and gradually migrate to the right as shown in FIGURE 1 where they are discharged through the outlet 14. Inasmuch as the sieve 10 is constantly vibrating, particles which may normally tend to adhere to the sieve for one reason or another will be prevented from doing so, and accordingly the mesh will not become clogged and reduce the efficiency of the sifting operation.

The powder introduced into the sifting apparatus by the inlet 13 will tend to accumulate in and about the first compartment containing rotary member 19a. During the sifting operation some of the powder will move toward the rotary member 19b and so on, but the quantity of powder in successive sections will be successively reduced. This is brought about by reason of the partition plates 21a to 21c. These plates prevent the free flow of the powder toward the outlet 14 and thus permit the introduction of relatively large amounts of powder without the danger of unsifted powder being discharged through the outlet 14. When the amount of powder introduced into the inlet 13 is small, the powder is nevertheless agitated by the blades or plates 20a through 20d and effective sifting is obtained. Even when the thickness of the powder layer on the bottom of the sieve is small so that the powder layer is not effectively agitated by the blades, displacement of the powder toward the outlet 14 by the partition plates 21a to 21c and the sifting operation is affected by a combination of the turbulence within the chamber and vibration of the chamber as previously described. It is desirable in the utilization of the plates 21a through 21c to provide small cutouts 36 in the bottom thereof as viewed more clearly in FIGURE 2 to facilitate movement of the coarse particles toward the discharge outlet 14.

By way of example, the embodiment of the invention described above was provided with various meshes from 48 mesh to 200 mesh and calcium carbonate powder could be sifted at speeds of 10 to 30 times the speeds of known sifting apparatus. The sifting precision was in the range of 90 to 95 percent irrespective of the particle sizes in the powder being sifted. These percentages correspond to the precision of standard precision sifting apparatus.

Figure 3:
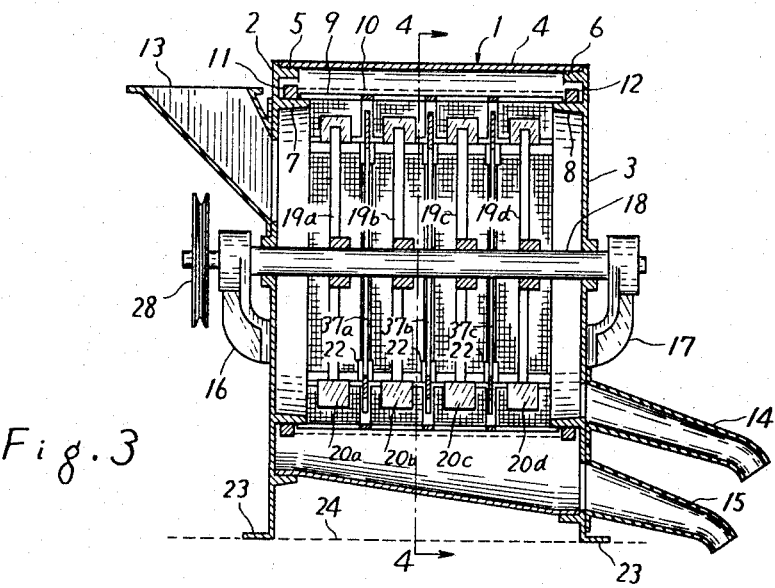
FIGURE 3 is a cross sectional view of another embodiment of a sifting machine in accordance with the invention.
Figure 4:
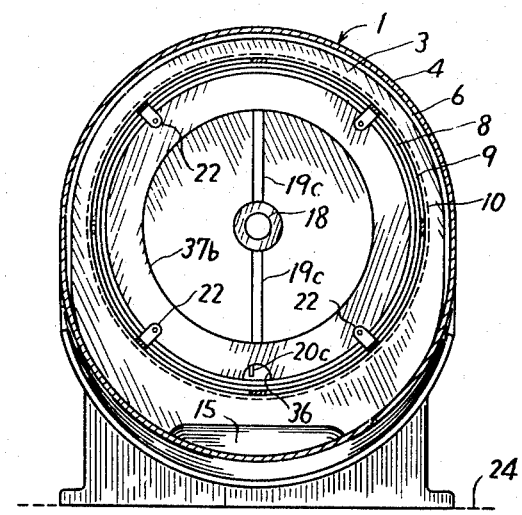
FIGURE 4 is a cross sectional view of FIGURE 3 taken along the line 4—4 thereof.

While the embodiment of the invention as described above is particularly useful for sifting powder particles having relatively large specific gravity, it may be desirable to modify the baffles 22 when sifting exceedingly fine particles having a relatively low mass or specific gravity. This modified structure is shown in FIGURES 3 and 4 and elements of this embodiment of the invention corresponding to elements of the embodiment shown in FIGURES 1 and 2 are denoted by like numerals. With exceedingly fine powder particles, it may be desirable to increase the speed of rotation of the blades or plates 20a through 20d, and at the same time it may be desirable to use annular partition plates 37a through 37c in place of the plates 21a through 21c of FIGURES 1 and 2. With the utilization of the annular plates 37a through 37c, transfer of the powder being sifted from one section to the next is restricted to prevent the discharge of unsifted powder through the outlet 14. As in the case with the previous embodiment of the invention, it is desirable to provide a cutout portion 36 at the bottom of each of the annular plates 37a through 37c as will be observed more clearly in FIGURE 4.

While certain embodiments of the invention have been illustrated and described, it is apparent that alterations, modifications and changes may be made without departing from the true scope and spirit thereof as defined by the appended claim.

What is claimed is:

1. A powder sifting machine comprising a closed housing including a first supporting plate, a horizontally disposed cylindrical sieve disposed within said housing, an inlet on one side of said housing for feeding powdered material into said sieve, a first outlet adjoining the bottom of the other side of said housing for the discharge of material passing through said sieve, a second outlet on the other side of said housing adjoining the lower edge of said sieve for the discharge of unsifted coarse particles, at least two rotary members within said sieve and rotatable about a horizontal axis, said rotary members each having a plurality of blades disposed about the periphery and in close proximity to said screen, said blades imparting high centrifugal force to said powder, a partitioning plate between said rotary members to limit the flow of powdered material toward said second outlet, said plate having a cut-out portion in the lower edge thereof, a bed supporting said housing and plate, resilient means securing said housing on said bed and vibrating means coupled to said housing and plate for vibrating said housing and plate at a frequency related to the resonant frequency of said housing and plate.

References Cited

UNITED STATES PATENTS

| | | | |
|---|---|---|---|
| 292,259 | 1/1884 | Schutz | 209—304 |
| 333,398 | 12/1885 | Dost | 209—287 X |
| 567,569 | 9/1896 | Maish | 209—287 |
| 575,992 | 1/1897 | Seck | 209—300 |
| 1,043,754 | 11/1912 | Gillot et al. | 209—296 |
| 3,007,576 | 11/1961 | Hannaford | 209—296 |

FOREIGN PATENTS

| | | |
|---|---|---|
| 625,745 | 2/1936 | Germany. |
| 659,799 | 5/1938 | Germany. |
| 705,997 | 5/1941 | Germany. |

HARRY B. THORNTON, *Primary Examiner.*

T. R. MILES, *Assistant Examiner.*